(12) United States Patent
Visser

(10) Patent No.: US 9,773,610 B2
(45) Date of Patent: Sep. 26, 2017

(54) ANTENNA ARRANGEMENT FOR WIRELESS POWERING

(71) Applicant: Stichting IMEC Nederland, Eindhoven (NL)

(72) Inventor: Hubregt Jannis Visser, Veldhoven (NL)

(73) Assignee: Stichting IMEC Nederland, Eindhoven (NL)

( * ) Notice: Subject to any disclaimer, the term of this patent is extended or adjusted under 35 U.S.C. 154(b) by 89 days.

(21) Appl. No.: 14/103,286

(22) Filed: Dec. 11, 2013

(65) Prior Publication Data

US 2014/0176082 A1 Jun. 26, 2014

(30) Foreign Application Priority Data

Dec. 21, 2012 (EP) .................................... 12198901

(51) Int. Cl.
*H02J 7/02* (2016.01)
*H02J 5/00* (2016.01)
(Continued)

(52) U.S. Cl.
CPC ............. *H01F 38/14* (2013.01); *H01Q 1/248* (2013.01); *H01Q 3/30* (2013.01); *H01Q 7/00* (2013.01);
(Continued)

(58) Field of Classification Search
CPC ...... H02J 7/025; H04B 5/0037; H04B 5/0075
(Continued)

(56) References Cited

U.S. PATENT DOCUMENTS 6,127,799 A 10/2000 Krishnan
8,634,928 B1 * 1/2014 O'Driscoll ........... A61N 1/3787
607/33

(Continued)

FOREIGN PATENT DOCUMENTS

WO 99/60512 11/1999
WO 2007/108371 A1 9/2007

OTHER PUBLICATIONS

European Search Report, European Patent Application No. 12198901.6, dated Apr. 3, 2013.
(Continued)

*Primary Examiner* — Samuel Berhanu
*Assistant Examiner* — Tarikh Rankine
(74) *Attorney, Agent, or Firm* — McDonnell Boehnen Hulbert & Berghoff LLP

(57) ABSTRACT

An antenna arrangement for transmitting energy is described. The antenna arrangement includes a planar array of two or more rectangular loop antennas, adapted to transmit energy at low frequencies via non-radiative resonant coupling and at high frequencies via radiative coupling. The low frequencies correspond to a wavelength with half of the wavelength being larger than the longest rectangular loop antenna dimension and the high frequencies correspond to a wavelength with half of the wavelength being approximately equal the longest rectangular loop antenna dimension. The antenna arrangement also includes a feeding network connected to the planar array, which includes a phase shifting means for providing a phase difference between signals at the high frequencies to be transmitted by different rectangular loop antennas of the planar array, whereby the amount of phase difference is related to the distance of the rectangular loop antennas to a focal point in the near-field of the planar array. The antenna arrangement also includes means
(Continued)

adapted for distributing the signals applied to the feeding network.

20 Claims, 8 Drawing Sheets

(51) Int. Cl.
    H04B 5/00      (2006.01)
    H01F 38/14     (2006.01)
    H01Q 1/24      (2006.01)
    H01Q 3/30      (2006.01)
    H01Q 7/00      (2006.01)
    H01Q 9/26      (2006.01)
    H01Q 21/06     (2006.01)
    H01Q 23/00     (2006.01)
    H02J 50/23     (2016.01)
    H02J 50/12     (2016.01)
    H02J 50/10     (2016.01)

(52) U.S. Cl.
    CPC ............ *H01Q 9/26* (2013.01); *H01Q 21/062* (2013.01); *H01Q 23/00* (2013.01); *H02J 7/025* (2013.01); *H02J 5/005* (2013.01); *H02J 50/10* (2016.02); *H02J 50/12* (2016.02); *H02J 50/23* (2016.02); *H04B 5/0037* (2013.01); *H04B 5/0081* (2013.01)

(58) Field of Classification Search
    USPC ...................................................... 320/108
    See application file for complete search history.

(56) References Cited

U.S. PATENT DOCUMENTS

| | | | | |
|---|---|---|---|---|
| 2002/0154518 A1* | 10/2002 | Elferich | ................. | H02J 5/005 363/15 |
| 2007/0153561 A1* | 7/2007 | Mickle | ............... | G06K 19/0707 363/170 |
| 2007/0159400 A1* | 7/2007 | DeJean | ................. | H01Q 1/243 343/700 MS |
| 2008/0211320 A1* | 9/2008 | Cook | ...................... | H02J 17/00 307/149 |
| 2008/0258981 A1* | 10/2008 | Achour | ............... | H01Q 21/065 343/702 |
| 2009/0045772 A1* | 2/2009 | Cook | ...................... | H02J 7/025 320/108 |
| 2009/0284082 A1 | 11/2009 | Mohammadian | | |
| 2010/0033021 A1* | 2/2010 | Bennett | .................. | H02J 17/00 307/104 |
| 2010/0117455 A1 | 5/2010 | Joannopoulos et al. | | |
| 2011/0109262 A1* | 5/2011 | Iizuka | .................. | B60L 11/182 320/108 |
| 2011/0133889 A1* | 6/2011 | Thomas | ............ | G06K 7/10079 340/8.1 |
| 2011/0260808 A1* | 10/2011 | Uchida | .................... | H01Q 3/36 333/139 |
| 2012/0217816 A1* | 8/2012 | Wang | ...................... | H02J 5/005 307/104 |

OTHER PUBLICATIONS

Karalis, Aristeidis et al., "Efficient Wireless Non-Radiative Mid-Range Energy Transfer", Annals of Physics, vol. 323, 2008, pp. 34-48.

* cited by examiner

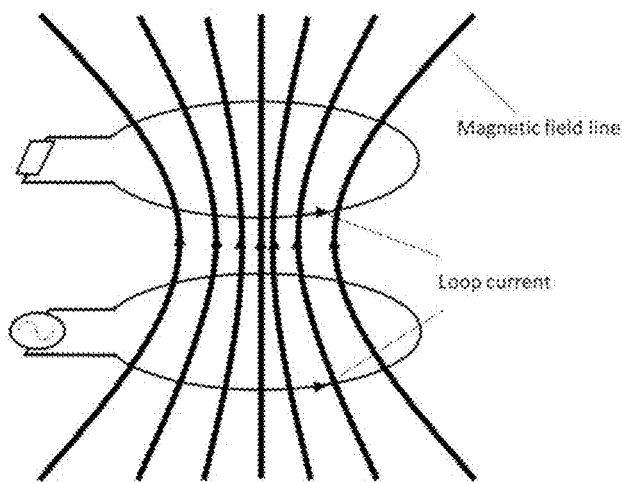
Fig.1 – Prior Art
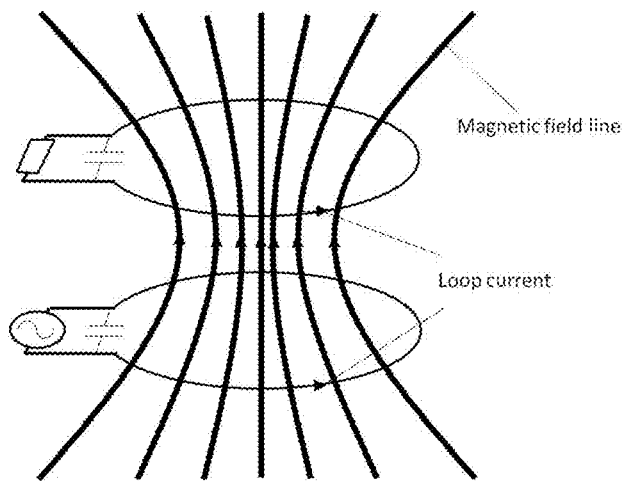
Fig.2 – Prior Art
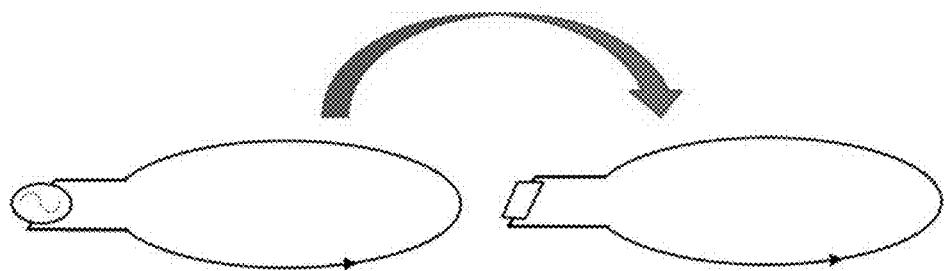
Fig.3 – Prior Art

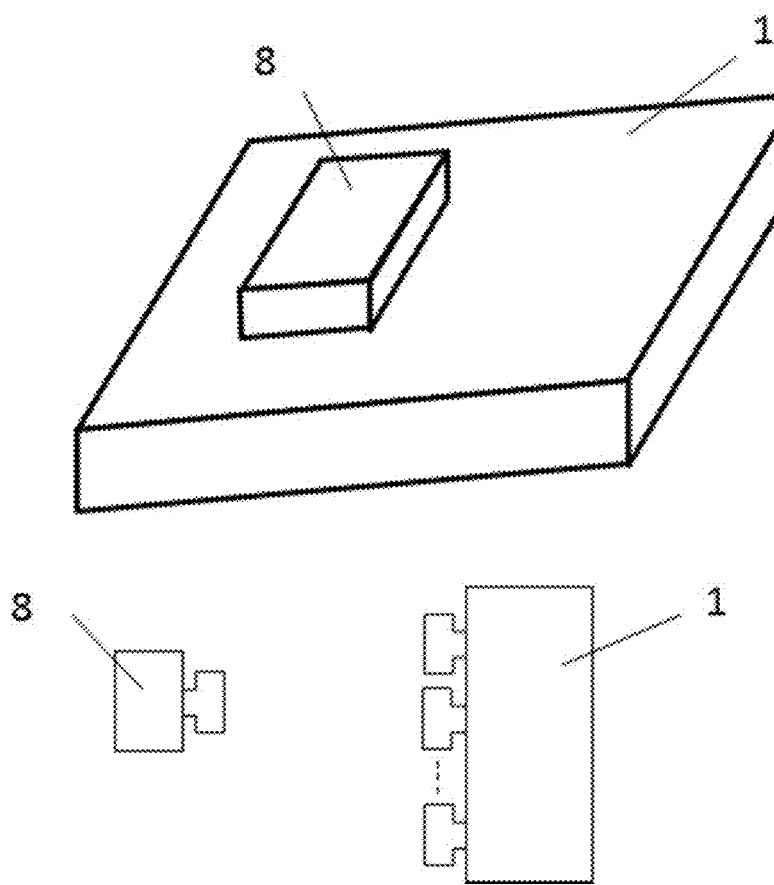
Fig.4 – Prior Art

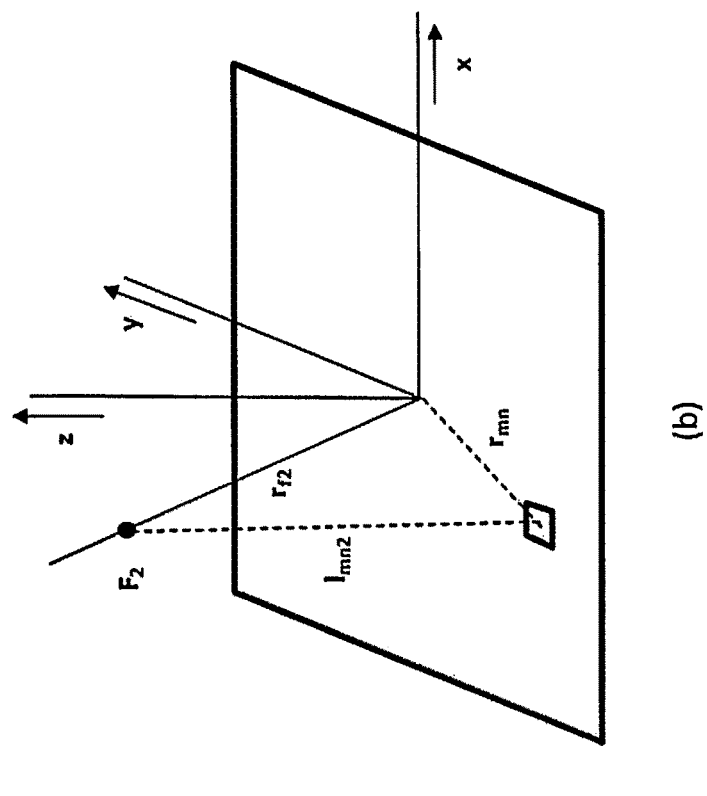
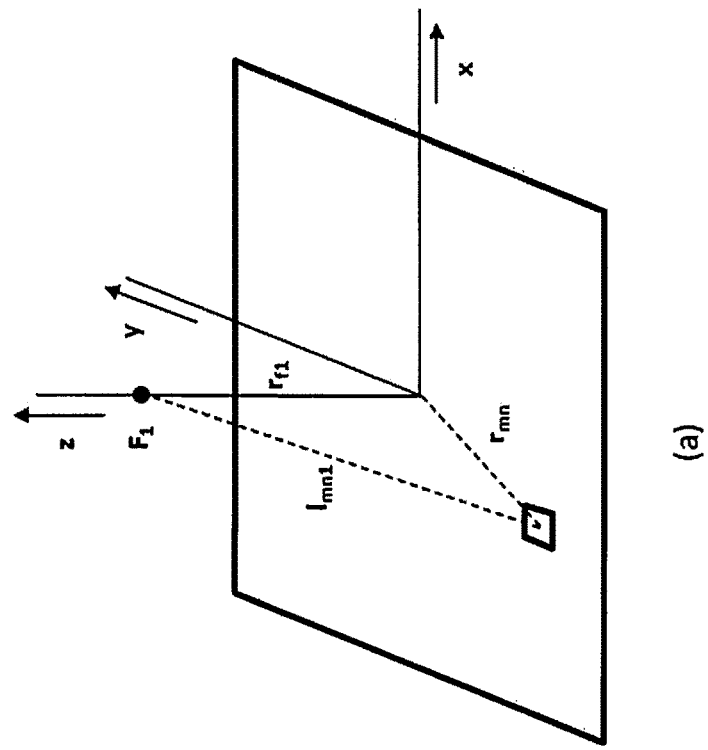
Fig.11

ANTENNA ARRANGEMENT FOR WIRELESS POWERING

CROSS REFERENCE TO RELATED APPLICATIONS

Pursuant to the provisions of 35 U.S.C. §119(b), this application claims priority to EP 12198901.6 filed Dec. 21, 2012, the entire contents of which are incorporated herein by reference.

FIELD

The present invention is generally related to the field of techniques and antenna structures for wireless powering.

BACKGROUND

RF energy transport through inductive coupling has been known for years and is used in, e.g., charging an electrical tooth brush. In its basic form, a loop is excited with a periodic (sinusoidal) current that creates a periodic magnetic field as indicated in FIG. 1. The receiver loop is placed in this periodically changing magnetic field and a periodic current is induced in this loop, so that a periodically changing voltage may be measured over a load connected to that loop, see FIG. 1.

Inductive coupling is very sensitive to loop (or coil, i.e., a multi-turn loop) positions. The loops need to be on top of each other and centred around the same axis, since the magnetic field lines will be concentrated around the transmitting loop axis.

By introducing capacitors at the loop terminals, a resonant system is created that is less position critical. RF power transfer takes place through non-radiative, resonant coupling, see FIG. 2. Resonant coupling is efficient (>95%) up to a coil-plane separation of about one coil diameter. Above that distance the power transfer efficiency drops quickly to zero. The coil circumference is much smaller than half a wavelength to prevent electromagnetic radiation. The resonance is obtained by the loop inductance in parallel with the capacitor. The usual frequency employed is 13.56 MHz.

With a loop circumference in the order of half a wavelength, the loop can become resonant by itself and start radiating electromagnetic waves. Since wavelength $\lambda$ is related to frequency f as $\lambda=c/f$, where c is the velocity of light, a system can be obtained that at a low frequency acts as a non-radiative resonant coupling system and at a high frequency as an antenna-to-antenna coupling.

Unfortunately, the loop antenna created by increasing the frequency (loop circumference becomes about half a wavelength) has its maximum radiation and sensitivity in the plane of the loop, which means that the loops would have to be displaced sideways for a distant antenna-to-antenna coupling, see FIG. 3. However, it is desirable to have an antenna with its maximum radiation and sensitivity perpendicular to the loop plane, so that both loops/antennas can be separated in the perpendicular direction.

The powering and synchronization (data exchange) of Short Range Devices (SRD), especially smartphones, is traditionally performed by applying cables between the SRD and a power outlet and/or a computer. Recently, wireless powering through magnetic resonant coupling as described above has been introduced, which allows a contactless powering by placing the SRD on a platform containing transmitting coils. Within the SRD, a receiving coil is present. Both coils together form a magnetic resonance system through which energy is transformed at a low frequency.

For the powering, the SRD must be in close contact with the powering platform. For the synchronization, one has to resolve to cables or Bluetooth if possible. Charging of the SRD when this SRD is at some distance from the powering station is not possible.

A typical implementation as well known in the art is shown in FIG. 4. A planar array of loops is formed to operate as transmitter (1) in a magnetic resonance power transfer system. The receiver (8), i.e., the SRD, is equipped with a receiving loop. A subsection of the transmitting loops and the receiving loop form a magnetic resonance power transfer system.

Methods to activate the relevant transmission loops, i.e., finding the position of the SRD on the powering station, are known in the art. The magnetic resonance loops may be used simultaneously for data exchange by applying state of the art technology. As already mentioned, the power transfer efficiency can reach around 95% for transmitter and receiver coils separations within one receiver coil radius, dropping to zero over an additional radius of distance.

For larger separations, the transmitter and receiver loops are employed as resonant folded dipole antennas in a UHF or microwave, license-free, Industry Science and Medicine frequency band, e.g., 865.6-867.6 MHz and 2.446-2.454 GHz. The loops/antennas in the powering station are used as an array antenna. 'Standard' far-field RF power transfer is not feasible. The power density delivered at distances in the range 1-3 m from the base stations respecting the international transmit power limits would be too low to charge a typical SRD battery within a reasonable time.

This problem can be illustrated with the following example. A smartphone battery of 4V is assumed having a capacity of 1 Ah. The non-duty-cycled Effective Isotropic Radiated Power (EIRP) is limited in the 2.446-2.454 GHz frequency band to 0.5 W. The received RF power is given by the Friis transmission equation:

$$P_R = \frac{EIRP \cdot G_R \lambda^2}{(4\pi)^2 r^2}$$

In this equation $P_R$ denotes the received RF power, $G_R$ the gain of the receive antenna, $\lambda$ the wavelength used and r the separation between transmit and receive antenna. The gain of a folded dipole antenna is 1.64. This results in a received RF power at 2 m distance of 4.9 µW. Assuming further a perfect RF to DC conversion still means that charging a half-full battery would take 4e6/4.9 hours which is equivalent to about 93 years. If the frequency is lowered to 866 MHz, the received power at a distance of 2 m (transmitting a continuous EIRP of 3.28 W) will be 156 µW. Although the power density is better at the lower frequency, it is still too low for practical smartphone battery charging applications.

Hence, there is a need for a solution that increases the functionality of contemporary wireless charging systems.

SUMMARY

An antenna arrangement that allows for wireless powering within a reasonable amount of time and with acceptable efficiency is described.

In a first aspect, an antenna arrangement for transmitting energy includes a planar array of two or more rectangular loop antennas, adapted to transmit energy at low frequencies via non-radiative resonant coupling and at high frequencies via radiative coupling, the low frequencies corresponding to a wavelength with half of the wavelength being substantially larger than the longest rectangular loop antenna dimension and the high frequencies corresponding to a wavelength with half of the wavelength being substantially equal to the longest rectangular loop antenna dimension. The antenna arrangement also includes a feeding network connected to the planar array and comprising phase shifting means for providing a phase difference between signals at the high frequencies to be transmitted by different rectangular loop antennas of the planar array, whereby the amount of phase difference is related to the distance of the rectangular loop antennas to a focal point in the near-field of the planar array, and means adapted for distributing the signals applied to the feeding network.

The proposed solution capitalizes on the specific shape of the loop antennas. Indeed, an array of rectangular loop antennas is provided that is so dimensioned that at low frequencies energy is transmitted via resonant coupling and at high frequencies via antenna-to-antenna coupling. Low and high frequencies are to be construed as follows. Low frequencies correspond to a wavelength $\lambda$ (via the well-known relationship $\lambda \cdot f = c$, with c the speed of light, $\lambda$ the wavelength and f the frequency) for which holds that the longest dimension of the rectangular loop antenna (hence, the long side of the rectangle) is much smaller than $\lambda/2$. Typically, half the wavelength is more than a factor ten larger than the length of the loop antenna. For high frequencies, on the contrary, holds that half the wavelength $\lambda$ is in the same order of magnitude as the longest dimension: most preferably the wavelength is approximately twice the longest dimension. The antenna arrangement further comprises a feeding network connected to the planar array. Phase shifting means are provided for realizing a phase difference between signals at the high frequencies to be transmitted by different rectangular loop antennas of the planar array. The amount of phase difference is thereby related to the distance of the rectangular loop antennas to a focal point in the near-field of the planar array. Another element of the antenna arrangement for transmitting energy concerns distribution means to distribute the signals applied to the feeding network over the loop antennas of the array.

In a preferred embodiment, the phase shifting means is arranged for adapting the phase differences between the signals. Advantageously, that adaptation is based on information exchanged by a device to be charged.

In a preferred embodiment, the planar array has a matrix structure. In an advantageous embodiment, the matrix structure has ten rows with each ten rectangular loop antennas.

In another embodiment, the feeding network is implemented on one or more separate circuit boards.

Preferably, the separate circuit boards have signal lines on both sides of the circuit board. In one embodiment, the signal lines comprise switching means.

In another aspect, an antenna arrangement for receiving energy includes at least one rectangular loop antenna adapted to receive energy at low frequencies via non-radiative resonant coupling and at high frequencies via radiative coupling. The low frequencies correspond to a wavelength with half of the wavelength being substantially larger than the longest rectangular loop antenna dimension and the high frequencies correspond to a wavelength with half of the wavelength being approximately equal to the longest rectangular loop antenna dimension.

Advantageously, the antenna arrangement for receiving energy comprises at least two of the rectangular loop antenna as well as a combining network connected to the at least two rectangular loop antenna and comprising phase shifting means for providing a phase difference between signals received via different rectangular loop antennas of the planar array, whereby the amount of phase difference is related to the distance of the rectangular loop antennas to a focal point in the near-field of the transmitting antenna array. This point may be in the near or far field of the receiving antenna arrangement. Also, means for combining the various signals output by the combining network are provided.

In a preferred embodiment, branches of the array formed by the at least two rectangular loop antennas comprises RF switch-operated short circuits.

Preferably, the size of the rectangular loop antennas' short side is smaller than one sixth of the wavelength of the transmitted or received signal.

In a preferred embodiment, the antenna arrangement comprises a balanced-unbalanced transformer for obtaining a single-ended signal.

In a further aspect, a system includes a transmitter device provided with an transmitter antenna arrangement as previously described and a receiver device provided with a receiver antenna arrangement as previously described.

In yet another aspect, a method for charging a device provided with an antenna arrangement for receiving energy as previously described includes a step of approaching with the device a powering station having an antenna arrangement for transmitting energy as described, whereby the powering station operates at a frequency at which energy is transmitted via radiative coupling, whereby the radiation is focussed in the near-field of the transmitting antenna arrangement.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

FIG. 1 illustrates the general principle of inductive coupling.

FIG. 2 illustrates non-radiative resonant coupling.

FIG. 3 illustrates resonant loop antenna positions for maximum coupling.

FIG. 4 illustrates conventional power transfer and data communication (synchronization) through a magnetic resonance system.

FIG. 11 illustrates a near-field focussed antenna array. In FIG. 11a the focal point $F_1$ is on the axis, whereas in FIG. 11b the focal point $F_2$ is off-axis.

DETAILED DESCRIPTION

Figure 5:
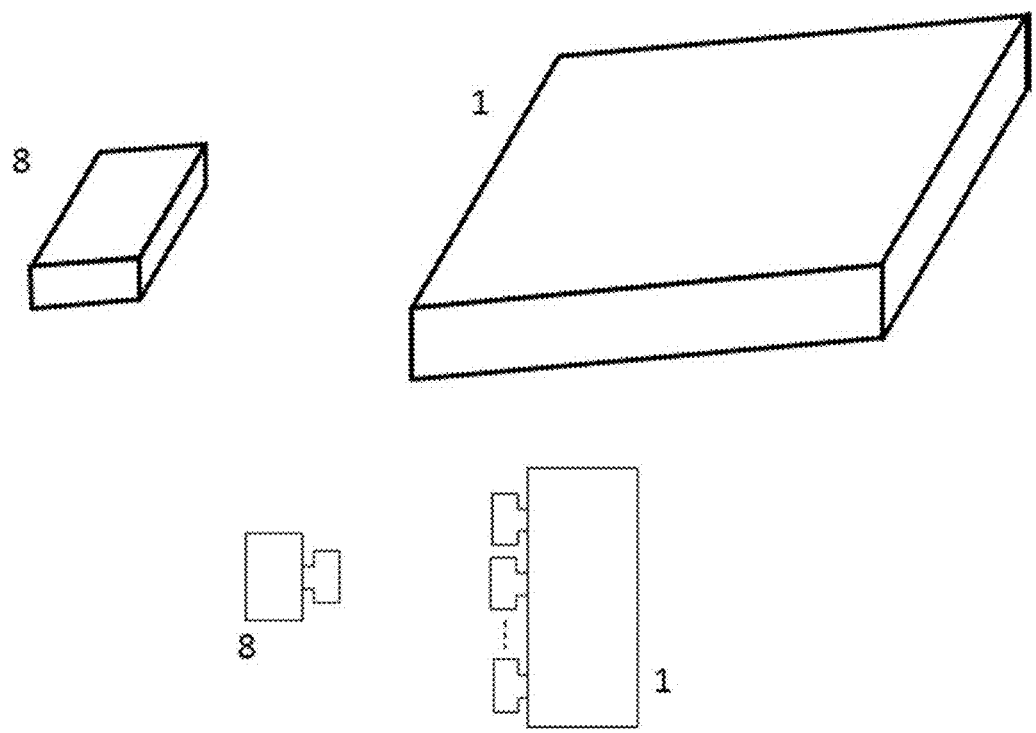
FIG. 5 illustrates power transfer and data communication (synchronization) through a radiative system employing a near-field focused array antenna.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising," used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present disclosure describes an antenna arrangement that increases the functionality of contemporary wireless charging systems. Charging is now made possible at high efficiency in close contact (just as before) and at a lower (but still acceptable) efficiency for distances around 1 to 3 meters from the powering station. Data exchange (synchronization) is possible at all distances. Thus, SRD charging will be possible not only by placing the SRD on the powering station. The battery will be charged also when the SRD is kept in a pocket, purse, or bag. FIG. 5 provides a conceptual illustration.

A planar array of loops is formed for accomplishing the electromagnetic resonant power transfer at low frequencies. The form of the loop is not arbitrary. The same type of loop is used as a single device in the mobile unit and as an array element in the transmitting base station.

Figure 6:
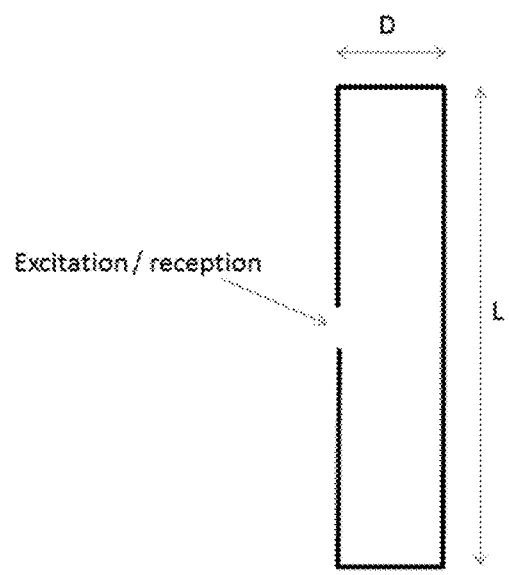
FIG. 6 represents the shape of loop antennas used in the antenna arrangements of the invention.

The loops (coils) are so shaped that they operate as small loops for low frequencies but as resonant folded dipole antennas at UHF or microwave frequencies. FIG. 6 illustrates the rectangular loop shape of the antennas applied in the present invention. The longest dimension of the rectangular shape is denoted L and the shortest D. At low frequencies, the antenna acts as a magnetic loop. The term 'low frequency' is defined as:

$$2(L+D) \ll \lambda$$

At the high frequencies, the antenna acts as a resonant folded dipole antenna. The term 'high frequency' is defined by the following relationships with the wavelength $\lambda$:

$$L \approx \lambda/2$$

and $$D < \lambda/6$$

For high frequencies, the antenna elements are excited with appropriate phase differences between the elements so that the transmitted energy is focused in a region about 1 to 3 meters in front of the planar aperture, where the presence of the SRD is most likely. The phase differences may also be applied adaptively, based on a wireless communication with the SRD, to direct the power to the exact SRD position.

The receiver 8 in the SRD is a rectangular loop structure acting as a small loop antenna at the lower frequencies and as a resonant folded dipole antenna at the higher frequencies, i.e., the same structure as at the transmitter. By adding RF switch-operated short circuits in the folded dipole arms, the impedance of the antenna may adaptively be changed and matched to the rectifier impedance. The rectifier impedance will change as a function of RF input power and, therefore, also as a function of distance from the RF source.

A feature of the proposed solution is that RF radiation is not focussed in the far-field, but rather in the near-field of the transmit antenna. The near-field can be defined as being at a distance from the transmitting antenna that is shorter than two times the square of the largest antenna dimension, divided by the wavelength of the emitted radiation. The near-field is a region in which there are strong inductive and capacitive effects from the currents and charges in the antenna that cause electromagnetic field components that do not behave like far-field radiation. These effects decrease in power far more quickly with distance than do the far-field radiation effects. Using a Near-Field-Focused Array antenna may in the near-field increase the power level with respect to the far-field value for an unfocused array up to a factor of 1000. That would reduce the charging time in the above-mentioned example to 26 hours. Although this value is still too large for practically charging a smartphone battery, the order of magnitude is such that the charging time can become practically applicable.

Power levels are (inter)nationally regulated by virtue of limits on the equivalent isotropically radiated power (EIRP). The EIRP is a quantity defined for the far-field of an antenna. When the energy is focused in the near-field of an antenna, the radiation beyond the focal area (in practice not a focal point but a focal area) diverges and consequently the EIRP will be lower than for an array having the energy focused in the far-field. This means that for a near-field-focused array more power may be transmitted than imposed by the EIRP limits without violating the ITU rules and without violating the recommendations concerning RF radiation and health issues. The latter limits are in general higher than the former ones. This additional degree of freedom is exploited to bring the SRD (e.g., smartphone) charging time back from some tens of hours to within an hour.

Figure 7:
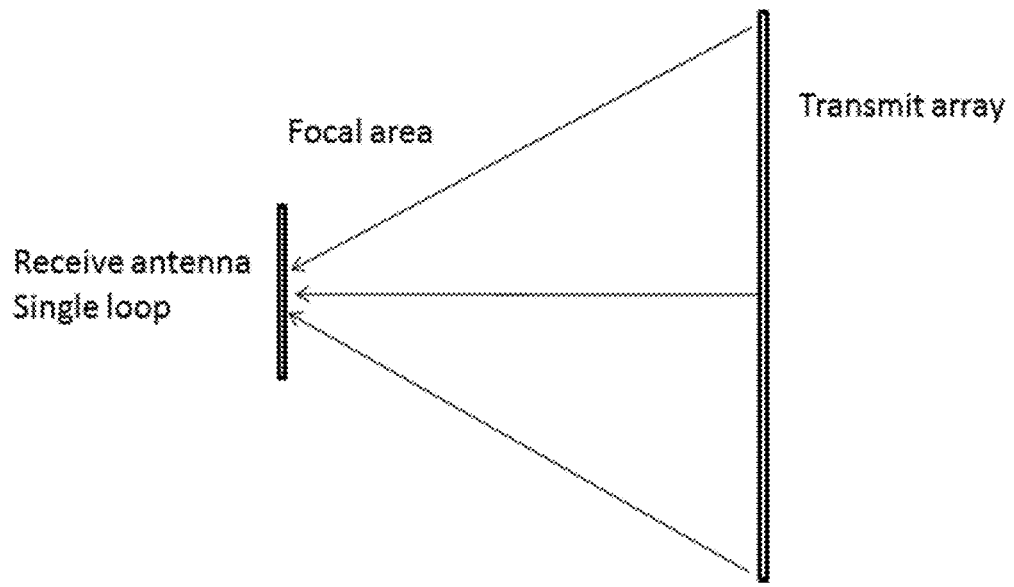
FIG. 7 illustrates the focal area of a receiver antenna arrangement with a single loop.
Figure 8:
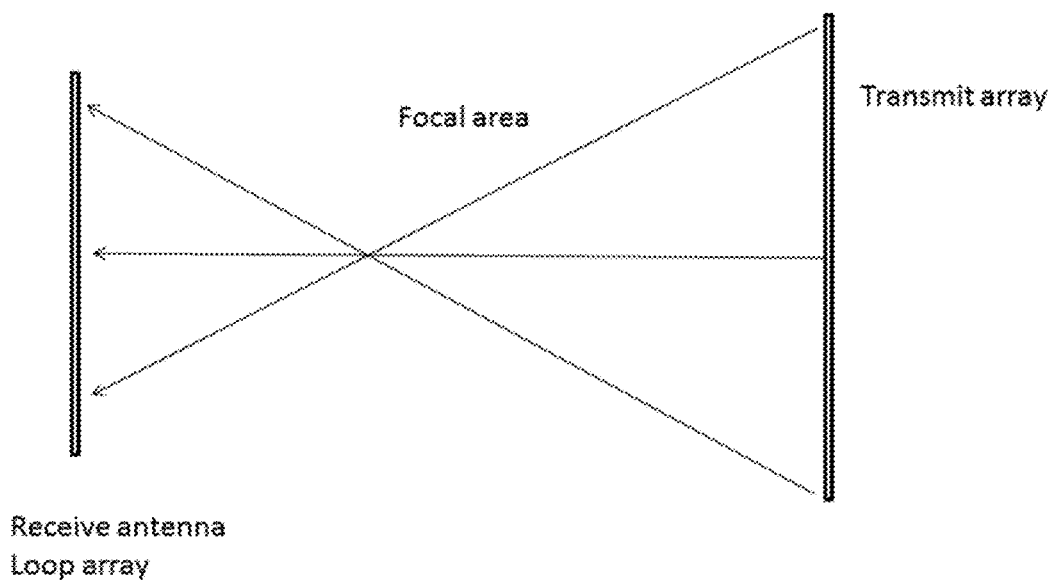
FIG. 8 illustrates the focal area of a receiver antenna arrangement with an array of loop antennas.

FIG. 7 shows a transmitting loop array antenna, focusing the power in the near field of the transmit antenna. In the focusing area, a single loop receive antenna is picking up the power. In FIG. 8, the same transmitting loop array antenna is focusing the power in the near field of the transmit antenna. The receive antenna now consists of several (>1) loop antennas that are phased for a maximum sensitivity in the near field of the receive array antenna. The receive antenna is positioned such that this region of focused sensitivity coincides with the focused power of the transmit antenna.

Some more details of embodiments of the antenna arrangement according to the invention are now described.

Figure 9:
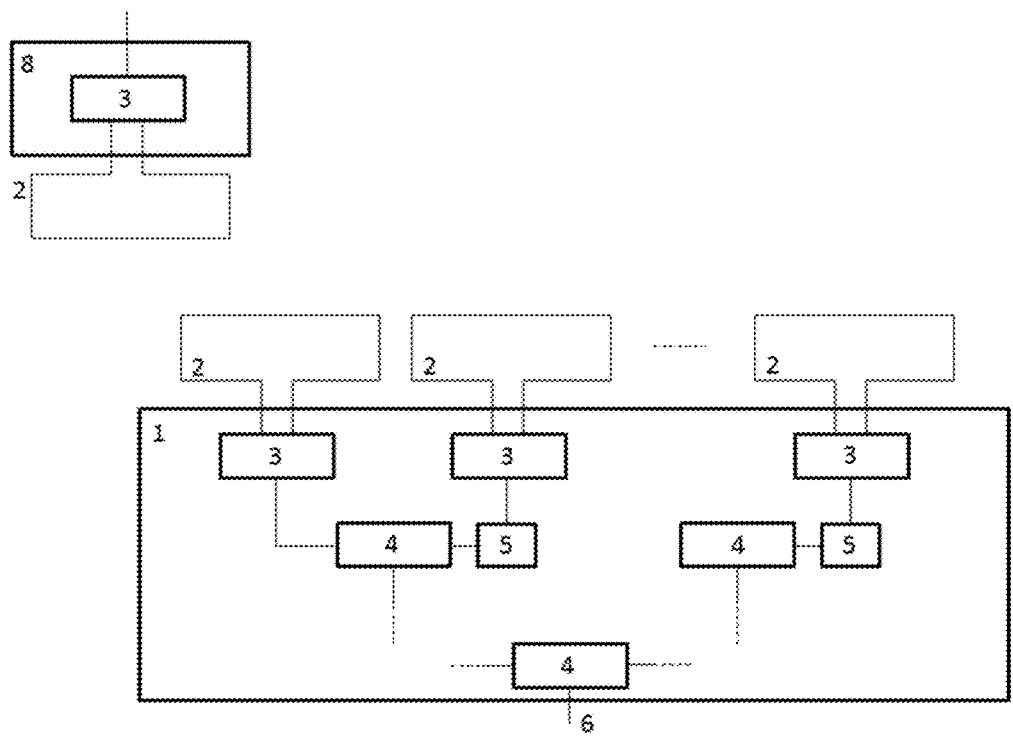
FIG. 9 illustrates an embodiment of a transmitter antenna arrangement and a receiver antenna arrangement, according to an example.

FIG. 9 depicts a receiver antenna structure with a single loop antenna positioned at some distance from a transmit antenna arrangement. Power to charge the SRD comprising the receiver is exchanged via radiative coupling. At the transmitter 1, an array with a plurality of rectangular loop antennas 2 is provided. The transmit input signal 6 is first applied to a power divider/combiner 4. The power divider/combiner 4 outputs signals to the various branches of the antenna array. Phase shifters 5 are provided so that the signals transmitted by the various loop antennas have a different phase. Optionally, in the different loop antenna branches a balanced-unbalanced transformer 3 (sometimes referred to as 'balun') can be implemented that through a 180 degrees signal phase-shifting converts a balanced folded dipole signal into a single-ended, unbalanced signal. The balanced-unbalanced transformer 3 allows transferring the signals from the unbalanced transmission line to the balanced input ports of the loops. In the embodiment shown in FIG. 9, the receiver antenna arrangement 8 comprises only one rectangular loop antenna 2.

Figure 10:
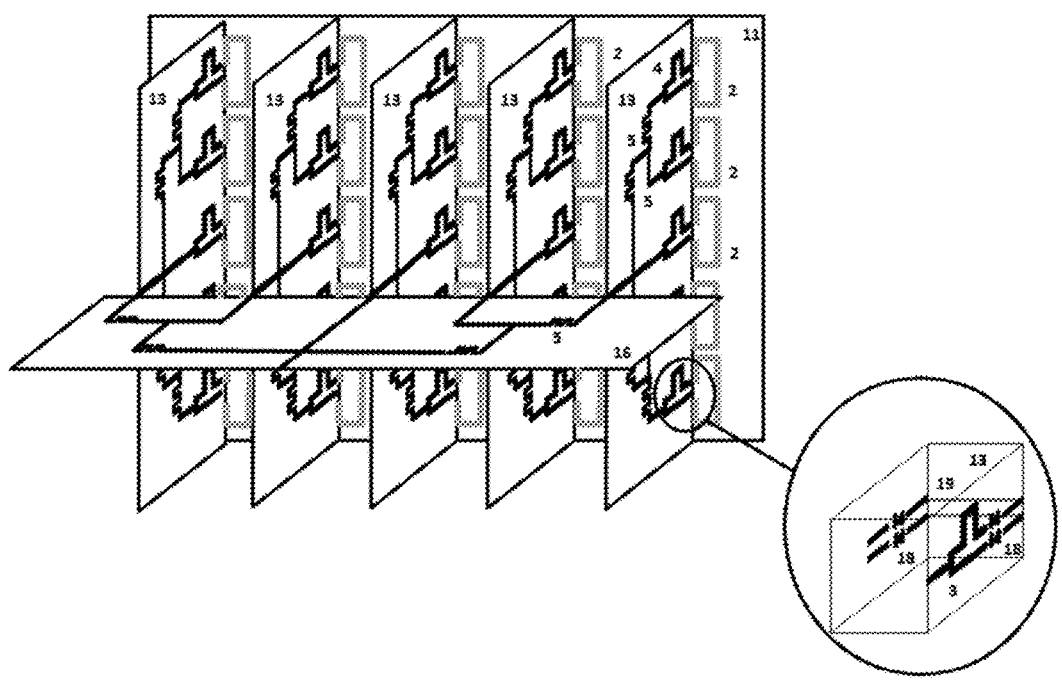
FIG. 10 illustrates a more detailed implementation of a transmitter antenna arrangement.

FIG. 10 shows more details of a transmit antenna. A flat surface 11 is covered with rectangular loops 2 that at low frequencies act as small loops and at a designated UHF or microwave frequency act as resonant folded dipole antennas. The loops/antennas are connected to the first stages of a corporate feeding network implemented on printed circuit board (PCB) surfaces 13. The surfaces are double-sided (see enlargement in FIG. 10), possibly separated by a common ground plane. The loops/antennas are connected to two signal lines on the left or right side of the surface 13. Through vias 19, these lines are connected to lines on the other side. Both pairs of lines are connected to a pair of PIN diodes 18 used for switching to either the high-frequency feed network or to the low-frequency feed network. The PIN diodes control and RF choking structures are not shown for the sake of clarity.

The RF feeding structures on 13 may comprise baluns 3 that through a 180 degrees signal phase-shifting convert the balanced folded dipole signal into a single-ended, unbalanced signal. In the feed network, phase-shifters 5 are incorporated through delaying the signal. A meandered structure as shown in FIG. 10 obviously delays the signal and in that way creates a phase-delay. In this way, a phase difference is obtained with respect to any line not having that piece of meandered line in it. In the feeding networks on surfaces 13, the columns of the array are arranged with the proper element-to-element phase differences.

The second stage of the feeding network is placed on surface 16 that combines the inputs/outputs of the feedings structures. The feeding structures on the surface combine the column feedings with the proper column-to-column phase differences.

As already indicated, on the receiver side, a similar switching arrangement for low and high frequencies is incorporated. The receive antenna may consist of a single loop or an array of loops. In the former case, a phase-delay network is not being applied and the single antenna at the high frequency is focused in its far-field (which will be at distances larger than half a wavelength away from the antenna). For an array, a similar network as described above may be employed that now functions as a combining network. The receive array will be focused for reception from the area defined for the transmitting antenna.

The transmission configuration for high frequencies, as shown, e.g., in the example of FIG. 10, aims to create a fixed focal area in front of the aperture of the antenna arrangement.

Applying electronic phase-shifters is particularly advantageous to position the focal area at a desired position in front of the aperture. This position does not necessarily have to be on the axis of the aperture as in FIG. 11a, but may be positioned off-axis, as shown in FIG. 11b.

In FIG. 11, the small square indicates an array element m,n. The position of element m,n is given by $$r_{mn} = \sqrt{x_m^2 + y_n^2}$$

The distance to on-axis focal point $F_1$ is given by (see FIG. 11a):

$$l_{mn1} = \sqrt{x_m^2 + y_n^2 + r_{f1}^2}$$

The additional distance compared to the distance $r_{f1}$ is thus:

$$\Delta l_{mn1} = \sqrt{x_m^2 + y_n^2 + r_{f1}^2} - r_{f1}$$

To compensate for the path length differences, every element m,n is excited with a phase:

$$\varphi_{mn} = -\frac{2\pi}{\lambda}\left[\sqrt{x_m^2 + y_n^2 + r_{f1}^2} - r_{f1}\right]$$

So that all signals coming from the elements m,n are in-phase at focal point $F_1$. $\lambda$ is the wavelength used. For a focal point off-axis, see $F_2$ in FIG. 11b, the element phase-excitations are:

$$\varphi_{mn} = -\frac{2\pi}{\lambda}\left[\sqrt{(x_{f2} - x_m)^2 + (y_{f2} - y_m)^2 + z_{f2}^2} - \sqrt{x_m^2 + y_n^2}\right]$$

Through a scanning technique (electronically adjusting the phase excitations) and a handshake communication with the smartphone (as is already implemented for magnetic resonance charging), the charging need and the position of the smartphone relative to the power station may be found. Then, if charging is required, power may be concentrated at the position of the smartphone.

At the receiving side, a single loop or array of antennas (depending on operation mode and frequency used) is employed, connected to a rectifier circuit that comprises one or more diodes or diode-switched transistors. The input impedance of this rectifying circuit depends on the RF input power level and, therefore, also on the distance from the transmitter. For an optimum power transfer from antenna to rectifying circuit, the input impedance of the antenna should be the conjugate value of that of the rectifying circuit. For a moving SRD, one may choose to design the antenna for an estimated average RF input power level or one may make the antenna input impedance adaptive. By placing short circuits in the arms of a (wire) folded dipole antenna, the complex impedance may be changed. This concept may be used for adaptively changing the input impedance for a maximum power transfer in the receptor.

Figure 12:
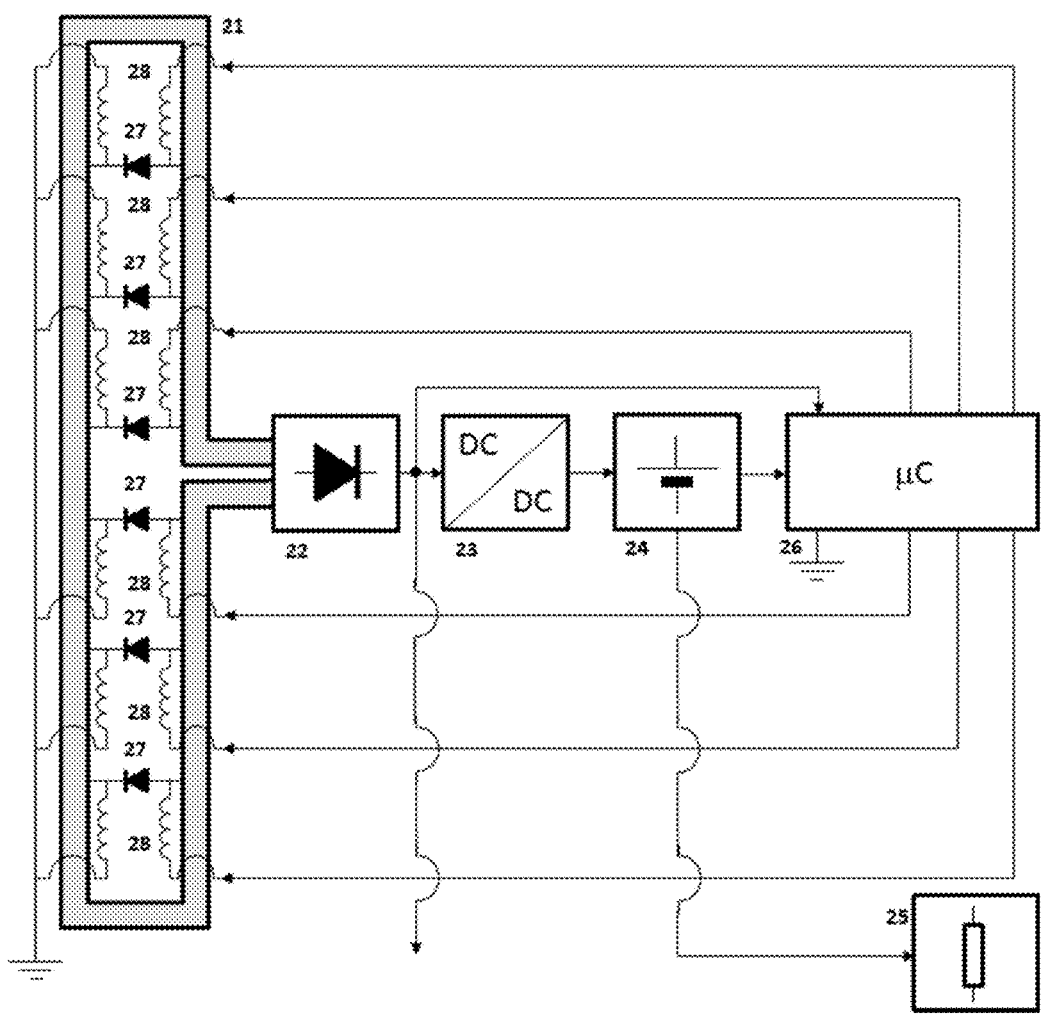
FIG. 12 illustrates a rectifying antenna with a folded dipole antenna.

FIG. 12 shows a rectenna (i.e., a rectifying antenna) consisting of a (strip) folded dipole antenna 21, connected to a rectifying circuit 22. The rectifying circuit 22 is connected to a DC-to-DC voltage boost circuit 23 that is charging a battery 24, which is not allowed to be completely empty. A discrete number of short-circuiting connections across the arms of the folded dipole may be operated by means of RF switches. In FIG. 12, pin diodes 27 are used for this purpose. The forward biasing scheme is controlled by a microcontroller 26 powered by the battery 24 and that bases the switching scheme on the obtained and to be maximized power after rectification. The DC biasing signals are separated from the RF signals by choking coils 28. The battery that is being recharged powers the application 25. An RF signal is available through a known technique for synchronization of data or communicating the powering needs and SRD position.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

The invention claimed is:

1. An antenna arrangement for transmitting energy, comprising:
   a planar array of two or more rectangular loop antennas, each rectangular loop antenna adapted to transmit energy at low frequencies via non-radiative resonant coupling and at high frequencies via radiative coupling as a folded dipole antenna, the low frequencies corresponding to a wavelength larger than twice a longest rectangular loop antenna dimension and the high frequencies corresponding to a wavelength approximately equal to twice the longest rectangular loop antenna dimension, the high frequencies being suitable for transmitting energy over larger distances than the low frequencies, the planar array so configured that at the high frequencies a fixed focal area is created in front of a planar aperture corresponding to the planar array, the fixed focal area being in the near-field of the planar array;
   a feeding network connected to the planar array and comprising a phase shifter for providing a phase difference between signals at the high frequencies to be transmitted by different rectangular loop antennas of the planar array, wherein the amount of phase difference compensates for a difference between a distance of the rectangular loop antennas to a focal point in the fixed focal area in the near-field of the planar array and a distance of the focal point to the planar array; and
   a power divider/combiner adapted for distributing the signals applied to the feeding network.

2. The antenna arrangement for transmitting energy of claim 1, wherein the phase shifter is arranged for adapting the phase differences between the signals.

3. The antenna arrangement for transmitting energy of claim 2, wherein the phase shifter is arranged for receiving information communicated by a device to be charged, the information being a basis for adapting the phase differences between the signals.

4. The antenna arrangement for transmitting energy of claim 1, wherein the planar array has a matrix structure.

5. The antenna arrangement for transmitting energy of claim 4, wherein the matrix structure has ten rows with each ten rectangular loop antennas.

6. The antenna arrangement for transmitting energy of claim 1, wherein the feeding network is implemented on separate circuit boards.

7. The antenna arrangement for transmitting energy of claim 6, wherein the separate circuit boards have signal lines on both sides of the circuit board.

8. The antenna arrangement for transmitting energy of claim 7, wherein the signal lines comprise switches.

9. The antenna arrangement for transmitting energy of claim 1, wherein a shortest rectangular loop antenna dimension has a length less than one sixth of the wavelength of a transmitted signal.

10. The antenna arrangement for transmitting energy of claim 1, wherein the antenna arrangement is provided in a transmitter device.

11. An antenna arrangement for receiving energy, comprising:
at least one rectangular loop antenna adapted to receive energy at low frequencies via non-radiative resonant coupling and at high frequencies via radiative coupling as a folded dipole antenna, the low frequencies corresponding to a wavelength larger than twice a longest rectangular loop antenna dimension and the high frequencies corresponding to a wavelength approximately equal to twice the longest rectangular loop antenna dimension, the high frequencies being suitable for receiving energy transmitted from larger distances than the low frequencies, the at least one rectangular loop antenna configured such that at the high frequencies a fixed focal area is created in front of a planar aperture corresponding to the at least one rectangular loop antenna, the fixed focal area being in the near-field of the at least one rectangular loop antenna.

12. The antenna arrangement for receiving energy of claim 11, further comprising:
at least two rectangular loop antennas arranged in a planar array, wherein each of the at least two rectangular loop antennas is configured such that at the high frequencies a fixed focal area is created in front of the planar aperture corresponding to the at least two rectangular loop antennas, the fixed focal area being in the near-field of the planar array;
a combining network connected to the at least two rectangular loop antennas and comprising a phase shifter for providing a phase difference between signals received via different rectangular loop antennas, wherein the phase difference compensates for a difference between a distance of the rectangular loop antennas to a focal point in the fixed focal area in the near-field of the rectangular loop antennas and a distance of the focal point to the planar array; and
a power divider/combiner adapted for combining signals output by the combining network.

13. The antenna arrangement for receiving energy of claim 12, wherein branches of the planar array formed by the at least two rectangular loop antennas comprises RF switch-operated short circuits across arms of the rectangular loop antennas.

14. The antenna arrangement for receiving energy of claim 11, wherein a shortest rectangular loop antenna dimension has a length less than one sixth of the wavelength of a received signal.

15. The antenna arrangement for receiving energy of claim 11, further comprising a balanced—unbalanced transformer.

16. The antenna arrangement for receiving energy of claim 11, wherein the antenna arrangement is provided in a receiver device.

17. A method for charging a device having an antenna arrangement for receiving energy that includes at least one rectangular loop antenna adapted to receive energy at low frequencies via non-radiative resonant coupling and at high frequencies via radiative coupling, the low frequencies corresponding to a wavelength larger than twice a longest rectangular loop antenna dimension and the high frequencies corresponding to a wavelength approximately equal to twice the longest rectangular loop antenna dimension, the high frequencies being suitable for receiving energy transmitted from larger distances than the low frequencies, comprising:
approaching the device with a powering station that includes an antenna arrangement for transmitting energy and operating at a frequency at which energy is transmitted via radiative coupling, wherein the energy transmitted via radiative coupling is focused in a near-field of the antenna arrangement for transmitting energy, and wherein the antenna arrangement for transmitting energy comprises:
a planar array of two or more rectangular loop antennas, each rectangular loop antenna adapted to transmit energy at the low frequencies via non-radiative resonant coupling and at the high frequencies via radiative coupling as a folded dipole antenna, the planar array so configured that at the high frequencies a fixed focal area is created in front of a planar aperture corresponding to the planar array, the fixed focal area being in a near-field of the planar array;
a feeding network connected to the planar array and comprising a phase shifter for providing a phase difference between signals at the high frequencies to be transmitted by different rectangular loop antennas of the planar array, wherein the amount of phase difference compensates for a difference between a distance of the rectangular loop antennas to a focal point in the fixed focal area in the near-field of the planar array and a distance of the focal point to the planar array; and
a power divider/combiner adapted for distributing the signals applied to the feeding network.

18. Antenna arrangement for transmitting energy, comprising:
a planar array of two or more rectangular loop antennas, each rectangular loop antenna adapted to transmit energy at low frequencies via non-radiative resonant coupling and at high frequencies via radiative coupling as a folded dipole antenna, the low frequencies corresponding to a wavelength larger than twice a longest rectangular loop antenna dimension and the high frequencies corresponding to a wavelength approximately equal to twice the longest rectangular loop antenna dimension, the high frequencies being suitable for transmitting energy over larger distances than the low frequencies, the planar array so configured that at the high frequencies a fixed focal area is created in front of a planar aperture corresponding to the planar array, the fixed focal area being in a near-field of the planar array;
a feeding network connected to the planar array and comprising phase shifting means for providing a phase difference between signals at the high frequencies to be transmitted by different rectangular loop antennas of the planar array, wherein the amount of phase difference compensates for a difference between a distance of the rectangular loop antennas to a focal point in the fixed focal area in the near-field of the planar array and a distance of the focal point to the planar array; and
distribution means for distributing the signals applied to the feeding network.

19. The antenna arrangement for transmitting energy of claim 1, wherein the low frequencies correspond to a wavelength larger than twenty times the longest rectangular loop antenna dimension.

20. The antenna arrangement for transmitting energy of claim 1, wherein the high frequencies correspond to a wavelength greater than six times the shortest rectangular loop antenna dimension.

* * * * *